Feb. 22, 1955 A. W. NIEMANN 2,702,736
POLAR LINEAR RECORDER
Filed April 9, 1952 2 Sheets-Sheet 1
Fig. 1.
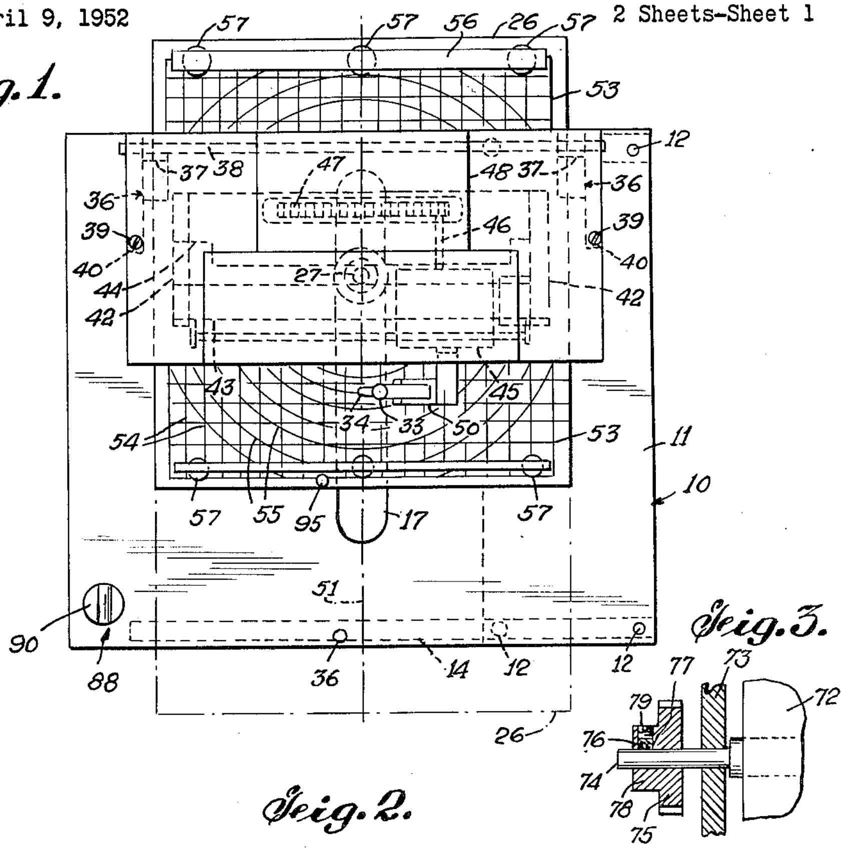
Fig. 3.
Fig. 2.
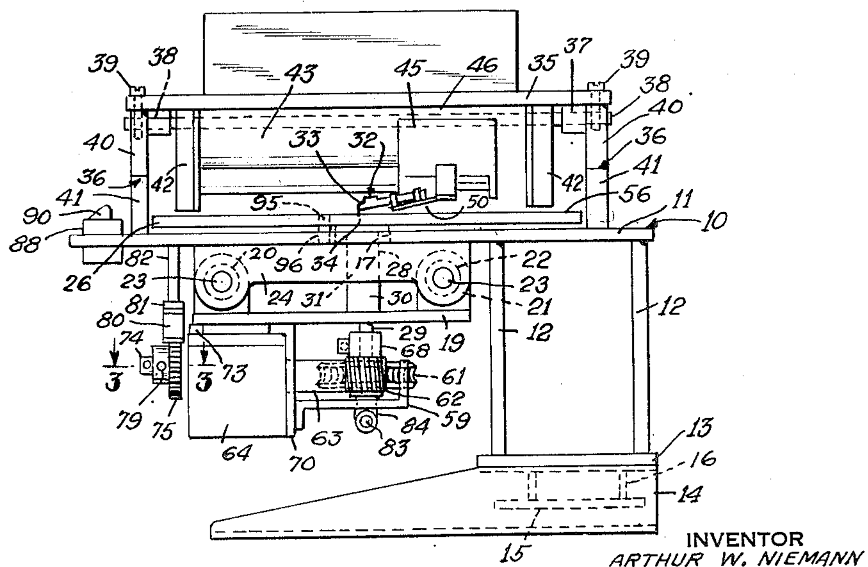
INVENTOR
ARTHUR W. NIEMANN
BY Edward Gottlieb
ATTORNEY Feb. 22, 1955 A. W. NIEMANN 2,702,736
POLAR LINEAR RECORDER
Filed April 9, 1952 2 Sheets-Sheet 2
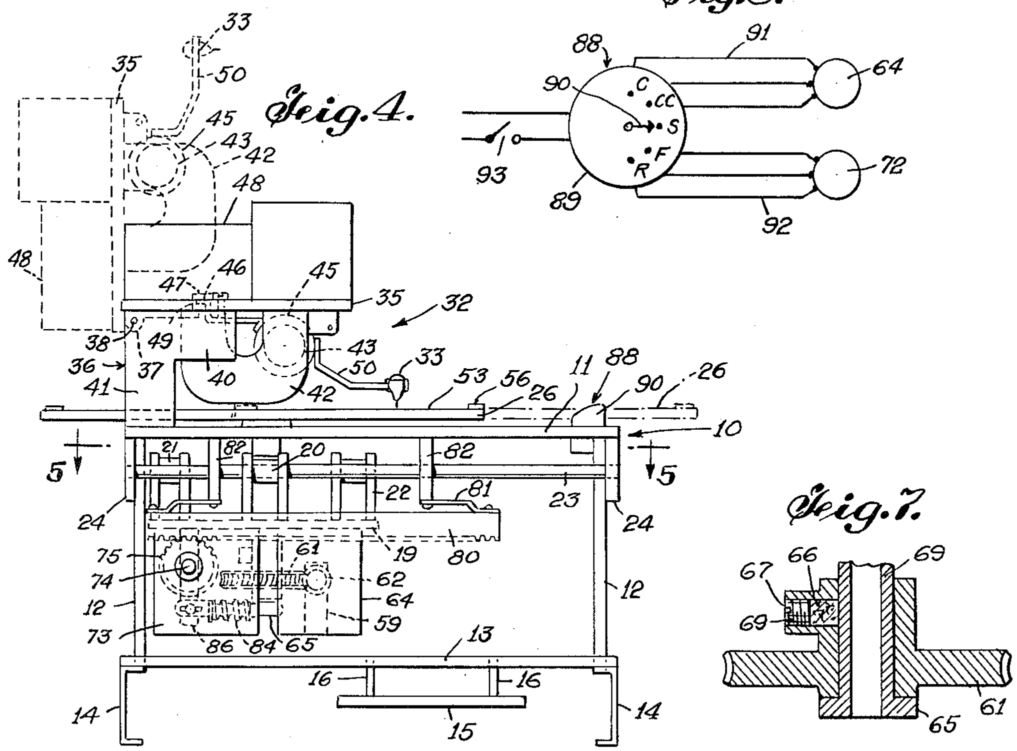
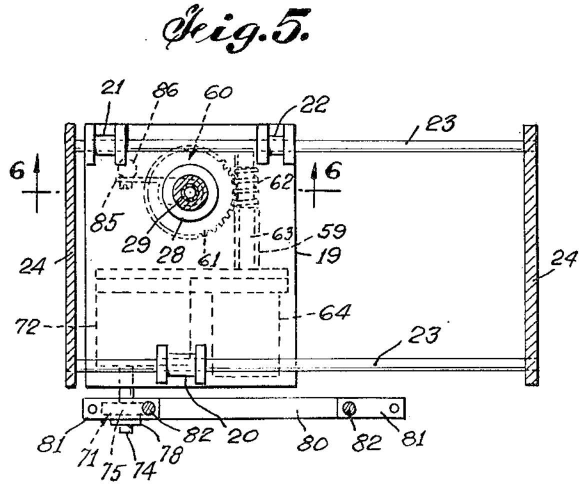
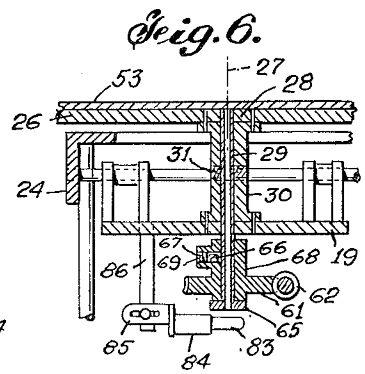
INVENTOR
ARTHUR W. NIEMANN
BY Edward Gottlieb
ATTORNEY United States Patent Office 2,702,736

Patented Feb. 22, 1955

1

2,702,736

POLAR LINEAR RECORDER

Arthur W. Niemann, Millington, N. J., assignor to Sound Apparatus Company, Stirling, N. J., a firm Application April 9, 1952, Serial No. 281,400

3 Claims. (Cl. 346—146)

This invention relates to new and useful improvements in recorders, and has more particular reference to a polar linear recorder.

More particularly, the invention proposes a simple and efficient graphic recorder which records in either polar or linear coordinates on graph paper, recording A. C. or D. C. voltage levels on either linear, square root, or decibel scales.

It is proposed to characterize the new polar linear recorder with a record table upon which the graph paper is mounted and which may move in a rectilinear path forwards and in reverse as desired, or in a rotary path clockwise or counter-clockwise.

The recording mechanism of the recorder may be of any design and construction provided it has a writing pen which travels transversely in relation to the longitudinal direction of the recorder which is from the front or near end to the back. The transverse path of travel of the writing pen must also be qualified as moving from and to a zero position.

It is proposed that the new recorder be provided with a carriage which is horizontally slidably mounted in said longitudinal direction on a housing. It is proposed that the record table be horizontal and turnably mounted on said carriage about a centrally located vertical axis. It is an important object of this invention to arrange said vertical axis along a longitudinal line passing through said zero position of said recording mechanism in order that said turntable may be longitudinally moved to a position in which said vertical axis and zero position are superimposed. In this latter position the record table may be turned for polar recordings.

Another object of this invention resides in providing a motor operated friction slip rotative drive on said carriage and connected with said record table for rotating said table about its vertical axis when polar recordings are desired.

Still another object of this invention resides in providing a motor operated friction slip longitudinal drive connected between said housing for the recorder and said carriage for moving said record table in a longitudinal path when linear recordations are desired.

It is also proposed to provide means for operating one or the other of said friction slip drives during the operation of the recording mechanism in order to make records in polar or linear coordinates.

Another and important object of this invention resides in providing the record table with a lighted opening coaxial with its vertical axis in order that a light spot may appear on a record sheet placed on said record table to assist in longitudinally positioning said record table to superimpose said zero position and said vertical axis in order to operate the recorder to record polar records.

Another object of this invention resides in the provision of a small pilot light to be used to light said lighted opening.

Still another object of this invention resides in providing said longitudinal drive with a resiliently mounted rack engaging a drive gear mounted on said carriage in order to maintain uniform contact to reduce back lash of the record table.

Still another object of this invention resides in so arranging the recording mechanism in a position over the record table that it may be hinged upwards free of the record table to either fully expose the record table when desired, or to expose the recording mechanism to adjustment or repair.

2

It is an important feature of this invention to provide the rotative and longitudinal drives mentioned above with friction slip constructions in order that the record table may then be manually moved into any turned or longitudinal position which is required for the proper operation of the recorder.

The invention also contemplates the provision of magnets mounted on the record table and cooperative with iron strips attracted by the magnets for holding a record sheet on the table in position.

Still another object of the invention is the construction of a device as described which is simple and durable and which may be manufactured and sold at a reasonable cost.

For further comprehension and to illustrate the invention, reference is made to the accompanying drawings forming a material part of this disclosure in which:

Fig. 1 is a plan view of a polar linear recorder constructed in accordance with this invention.

Fig. 2 is a front view of the recorder shown in Fig. 1.

Fig. 3 is an enlarged fragmentary sectional view taken on the line 3—3 of Fig. 2, the motor thereof being not shown in section.

Fig. 4 is a side elevational view of Fig. 1 looking from the left hand side.

Fig. 5 is a fragmentary horizontal sectional view taken on the line 5—5 of Fig. 4.

Fig. 6 is a fragmentary vertical sectional view taken on the line 6—6 of Fig. 5.

Fig. 7 is a fragmentary enlarged detailed view of a portion of Fig. 6.

Fig. 8 is a schematic wiring diagram of the two motors used in the rotative and longitudinal drives of the recorder.

The polar linear recorder, in accordance with this invention, includes a housing 10 consisting of a top panel 11, several vertical posts 12 supporting said top panel 11 upon a bottom panel 13 which in turn is mounted upon base channels 14. A small auxiliary bottom panel 15 is mounted on the bottom side of the bottom panel 13 with several posts 16. The panels 13 and 15 are intended to support the electronic devices (not shown) of the recorder. The top panel 11 is provided with a longitudinal slot 17 along its longitudinal center which extends from the front or near end of the panel 11, as viewed in Fig. 1, to the back or far end.

A carriage 19 is horizontally slidably mounted in a longitudinal direction upon said housing 10. More particularly, the carriage 19 is provided with three tubular linear ball bearings 20, 21 and 22 mounted on its top side and slidably engaging upon two horizontal rods 23 extending longitudinally of the housing 10 and mounted upon front and rear bracket 24 attached upon the bottom of the top panel 10. The bearing 20 is located at the center of one side of the carriage 19. The bearings 21 and 22 are located at the ends of the other side of the carriage 19.

A horizontal record table 26 is turnably mounted on said carriage 19 about a centrally located vertical axis 27 (see Fig. 1 and 6). The record table 26 is turnably mounted on said carriage by a tube 28 which is fixedly attached coaxial of said vertical axis 27 upon the bottom side of said record table 26. A hollow shaft 29 is coaxially fixedly attached to said tube 28 and extends downwards through a support tube 30 attached upon said carriage 19. A thrust bearing 31 is engaged about the hollow shaft 29 and rests upon the top of the support tube 30 and supports the tube 28 so that the record table 26 is free to turn.

A recording mechanism 32 is mounted on said housing 10 and is provided with a writing pen 33 which travels transversely in relation to said longitudinal direction from and to a zero position 34 (see Figs. 1 and 2). The recording mechanism 32 may be of any design and construction. Numerous recording mechanisms of the above mentioned type are now on the market and disclosed in various patents. For example, one type of such recording mechanism is shown in the patent to Arthur W. Niemann, No. 2,581,133, granted January 1, 1952. The recording mechanism 32 is mounted upon a panel 35 which is supported upon a pair of spaced brackets 36 fixedly mounted upon the top panel 11 and spaced slightly more than the width of the record table 26 and positioned to the sides of said record table 26.

The panel 35 rests upon the top of the brackets 36 and is hingedly attached to said brackets 36 by a pair of hinges 37 attached to the rear end portion of the panel 35 and extending between the brackets 36 and pivotally connected to the brackets 36 with a pivot rod 38. The panel 35 may be hinged upwards to a vertical position as shown by the dot and dash lines in Fig. 4 in order to expose the recording mechanism 32 for adjustment or repair and to expose the record table 26 if this is desired. Several clamp screws 39 normally engage through the panel 35 and threadedly engage the brackets 36 for holding the panel 35 in a horizontal position. The brackets 36 have overhanging top portions 40 and relatively narrow bottom portions 41 in order that the record table 26 may be moved to a relatively central position on the top panel 11, in which position it clears the narrow portions 41 of the brackets 36 so as to be free to be turned.

The said recording mechanism 32 includes a pair of spaced magnets 42. A traverse rod 43 is magnetically connected with like poles of the magnets 42. A bar of magnetic material 44 is magnetically connected with the other like poles of the magnets 42. These magnets 42 are mounted on the bottom of the panel 35. A driving coil 45 is slidably mounted on the rod 43. This driving coil 45 supports a potentiometer arm 46 which engages the contact train 47 of a potentiometer 48 mounted on the panel 35. The panel 35 is formed with an opening 49 through which the potentiometer arm 46 engages the contact train 47. A pen holder 50 is mounted on the driving coil 45 and supports the writing pen 33. When the driving coil 45 is in its extreme right hand position, as illustrated in Figs. 1 and 2, the writing point of the writing pen 33 will be in said zero position. The rod 43 extends in a transverse direction at right angles to a longitudinal line 51 which extends through said zero position 34 and through the vertical axis 27 (see Fig. 1). During operation of the recording mechanism 32 the writing pen 33 will travel transversely, that is, from right to left and back only. The writing pen 33 may travel to its maximum distance to the left and then back again to the zero position 34. The details of construction and operation of the mechanism operating said writing pen 33 may be clearly understood by examining the Niemann patent referred to, supra.

A sheet of graph paper 53 is mounted upon the record table 26 for receiving the writings from the pen 33. This graph paper 53 may be imprinted with rectilinear lines 54 and polar lines 55 in order to be capable of recording both linear and polar recordings of the recorder. This graph paper 53 may be graduated into linear, logarithmic, or any other pattern as desired. The graph paper 53 is stationarily held on the record table 26 by two iron strips 56 extending across the front and the rear edge portions of the graph paper 53 and held in position by several small magnets 57 mounted along the edge portions of the record table 26.

The record carriage 26 is associated with a motor operated friction slip rotative drive 60 mounted on said carriage 19 and connected with said record table 26 for rotating said table 26 about its vertical axis 27. This rotative drive comprises a worm wheel 61 mounted upon the bottom of the shaft 29 and meshing with a worm pinion 62 mounted on the shaft 63 of a synchronous motor 64 which is mounted on the carriage 19. A bracket 59 steadies said shaft 63. The worm wheel 61 is loose on the hollow shaft 29 so that it may turn. The shaft 29 is provided with a bottom head 65 to hold the worm wheel 61 from coming off. A friction slip device connects the worm wheel 61 and hollow shaft 29 to transmit rotations. This friction slip device comprises a small piece of felt 66 mounted in a bore 67 formed through the side of a hub portion 68 of the worm wheel 61. An adjustment screw 69 threadedly engages the bore 67 and controls the pressure between the felt 66 and the shaft 29. The adjustment screw 69 may be adjusted so that the record table 26 is driven by the electric motor 64 without any slipping taking place. However, the record table 26 is always free to be manually turned since a person may easily supply sufficient force to overcome the friction slip drive. The tube 28 extends through said longitudinal slot 17 formed in the panel 11. The motor 64 is mounted upon the carriage 19 by being directly mounted on a bracket 70, which in turn is mounted on the bottom of the carriage 19. The bracket 59 is mounted on said bracket 70.

The carriage 19 is associated with a motor operated friction slip longitudinal drive 71 connected between said housing 10 and said carriage 19 for moving said record table 26 in a longitudinal path. This longitudinal drive includes a synchronous motor 72 mounted upon a bracket 73 mounted upon the bottom of the carriage 19. The shaft 74 of the motor 72 supports a gear 75 which is loose on the shaft 74. A friction slip device connects the gear 75 with the shaft 74. This friction slip device comprises a piece of felt 76 mounted in a bore 77 formed in the hub portion 78 of the gear 75. An adjustment screw 79 is also threadedly mounted in the bore 77 and controls the pressure between the felt 76 and the shaft 74. The gear 75 meshes with a rack 80 resiliently mounted on the panel 11. This resilient mounting is accomplished with a pair of leaf springs 81 which are attached at one of their ends to the ends of the rack 80. The other ends of the leaf springs 81 are attached to posts 82 projecting downwards from the panel 11. The leaf springs 81 allow the rack 80 to pivot as the gear 75 is driven along the length of said rack. The rack 80 extends longitudinally of the panel 11. The purpose of the leaf springs 81 is to maintain a constant pressure between the gear 75 and the rack 80 to reduce or eliminate back lash. The electric motor 72 is capable of rotating the gear 75 in one direction or the other to cause it to travel along the length of the rack 80 and in this way longitudinally move the carriage 19. However, the record table 26, which is connected with the carriage 19, may be manually moved forwards and rearwards in a longitudinal direction any time at all as a person is capable of providing sufficient force to cause slippage between the gear 75 and the motor shaft 74.

The hollow shaft 29 extends all the way through to the top of the record table 26. A small pilot lamp 83 is mounted in an electric socket 84 which is attached by a bracket 85 to a post 86 extending downwards from the carriage 19. This pilot lamp 83 is positioned beneath the open bottom of the hollow shaft 29 so as to throw light upwards through the shaft 29 and throw a light spot upon the graph paper 53. This light spot makes it possible to correctly position the graph paper 53 so that the center of the polar coordinates 55 of the graph paper 53 are aligned coaxial with the vertical axis 27 which extends through the axis of the hollow shaft 29.

Selector means 88 is provided for operating one or the other of said friction slip drives 60 and 71 during the operation of the recording mechanism. This selector means includes a selector switch 89 having several settings operated by the control knob 90 of the switch 89. These settings control circuits 91 and 92, respectively controlling the electric motors 64 and 72. The selector switch 89 has positions indicating clock and counter-clock rotation for the record table 26 by correspondingly operating the electric motor 64, and forward and rearward motion of the record table 26 by correspondingly operating the electric motor 72. The selector switch 89 also has a stationary position. A main switch 93 controls current to the selector switch 89. The details of the wiring diagram of the selector switch and the reversible electric motors 64 and 72 will not be given in this specification since they form no part of the invention and they are common knowledge in the electrical field.

The record table 26 is provided with a small opening 95 for a clamp screw which may threadedly engage a threaded opening 96 formed in the edge portion of the panel 11 so that the record table 26 may be stationarily clamped down during shipping of the recorder.

The operation of the device may be understood from the following:

The vertical axis 27 of the record table 26 is located along the longitudinal line 51 which passes through the zero position 34 of the writing pen 33 of the recording mechanism 32, in order that the record table 26 may be longitudinally moved to a position in which its vertical axis 27 and the zero position 34 are superimposed. The pilot light 83 illuminates a small spot upon the graph paper 53 which permits the graph paper to be positioned with its center coinciding with said axis 27.

The graph paper 53 is secured in this position by the iron strips 56 which are held down by the small permanent magnets 57 on the record table 26.

The polar linear recorder may now be used to record polar recordations by operating the selector switch 89 to cause the electric motor 64 to rotate clockwise or counterclockwise as desired. The recording mechanism 32 will fluctuate in a transverse direction and will write upon the graph paper 53 simultaneous with the turning of this graph paper 53 around its center by the record table 26. The record table 26 may perform a complete rotation of 360°, or more or less as desired during the recording operation.

Linear recordings are made merely by moving the record table 26 to a rear position or a front position as desired. The record table 26 is free to be manually moved to any desired position because of the slip between the gear 75 and the shaft 74 of motor 72. The selector switch 89 is now set to operate the record table 26 in a forward or rearward direction as desired. The electric motor 72 will drive the record table forwards or rearwards as desied. During the forward or rearward motion of the record table 26 the writing pen 33 will fluctuate transversely and record on one half of the graph paper 53, that half which lies to the left of the longitudinal line 51. After a record on this half has been completed, the record table 26 may be manually turned around through 180°. This manual turning is possible because of the slip between the hollow shaft 29 which rotates the record table 26 and the worm gear 61. Now the record table 26 may be moved to a forward or rearward position and the recorder operated so that the writing pen 33 will now record on that half of the graph paper 53 which now lies to the left of the longitudinal line 51.

While I have illustrated one form of this invention, it will clearly be understood that other forms and modifications of the illustrated form may be provided within the broad spirit of the invention and broad scope of the claims.

Having thus described my invention, what I claim as new and desire to secure by United States Letters Patent is:

1. In a polar linear recorder, a housing, a carriage slidably mounted on said housing for horizontal rectilinear movement, a horizontal record table disposed above and supported by said carriage for rotation about a centrally located vertical record table drive shaft, a recording mechanism mounted on said housing above said record table and having a writing member supported thereby for movement at right angles to the direction of movement of said carriage, friction clutch drive means supported by said carriage for imparting rotation to said drive shaft, a motor operatively connected to said friction clutch drive means, friction clutch drive means between said housing and said carriage for imparting said rectilinear movement to the latter, a second motor operatively connected to said last drive means, a selector switch provided with a plurality of settings operable by a control knob, and said motors being provided with circuits controlled by said settings whereby the said carriage and record table drive means are selectively operable during the operation of the recording mechanism.

2. In a polar linear recorder, a housing, a carriage slidably mounted on said housing for horizontal rectilinear movement, a horizontal record table disposed above and supported by said carriage for rotation about a centrally located vertical record table drive shaft, a recording mechanism mounted on said housing above said record table and having a writing member supported thereby for movement at right angles to the direction of movement of said carriage, friction clutch drive means supported by said carriage for imparting rotation to said drive shaft, a motor operatively connected to said friction clutch drive means, friction clutch drive means between said housing and said carriage for imparting said rectilinear movement to the latter, a second motor operatively connected to said last drive means, a selector switch provided with a plurality of settings operable by a control knob, and said motors being provided with circuits controlled by said settings whereby the said carriage and record table drive means are selectively operable during the operation of the recording mechanism, the slidable mounting of said carriage on said housing being provided by a pair of laterally spaced horizontal rods having their opposite ends supported by said housing, and a plurality of bearings supported by said carriage in surrounding slidable engagement with said rods.

3. In a polar linear recorder, a housing, a carriage slidably mounted on said housing for horizontal rectilinear movement, a horizontal record table disposed above and supported by said carriage for rotation about a centrally located vertical record table drive shaft, a recording mechanism mounted on said housing above said record table and having a writing member supported thereby for movement at right angles to the direction of movement of said carriage, friction clutch drive means supported by said carriage for imparting rotation to said drive shaft, a motor operatively connected to said friction clutch drive means, friction clutch drive means between said housing and said carriage for imparting said rectilinear movement to the latter, a second motor operatively connected to said last drive means, a selector switch provided with a plurality of settings operable by a control knob, and said motors being provided with circuits controlled by said settings whereby the said carriage and record table drive means are selectively operable during the operation of the recording mechanism, said drive means between said housing and said carriage comprising a motor driven gear supported by the carriage and a horizontal rack yieldably supported by the housing.

References Cited in the file of this patent

UNITED STATES PATENTS

| | | |
|---|---|---|
| 389,273 | Weston | Sept. 11, 1888 |
| 484,905 | Bodding | Oct. 25, 1892 |
| 910,630 | Young | Jan. 26, 1909 |
| 921,628 | Platter | May 11, 1909 |
| 1,310,201 | Maxim | July 15, 1919 |
| 1,365,732 | Schmid et al. | Jan. 18, 1921 |
| 2,102,708 | Howle | Dec. 21, 1937 |